US012647194B2

(12) United States Patent
    Abdelhameed et al.

(10) Patent No.: US 12,647,194 B2
(45) Date of Patent: Jun. 2, 2026

(54) VALIDATING SYNCHRONIZED LOCAL TIMES OF AT LEAST A FIRST AND A SECOND CONTROL UNIT

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 308 days.

(21) Appl. No.: 18/563,434

(22) PCT Filed: Apr. 26, 2022

(86) PCT No.: PCT/EP2022/060951
    § 371 (c)(1),
    (2) Date: Nov. 22, 2023

(87) PCT Pub. No.: WO2022/248137
    PCT Pub. Date: Dec. 1, 2022

(65) Prior Publication Data
    US 2024/0243830 A1     Jul. 18, 2024

(30) Foreign Application Priority Data

May 28, 2021    (EP) .................................... 21176508

(51) Int. Cl.
    *H04J 3/06*        (2006.01)
    *H04J 3/14*        (2006.01)
(52) U.S. Cl.
    CPC .......... *H04J 3/0667* (2013.01); *H04J 3/0644* (2013.01); *H04J 3/14* (2013.01)

(58) Field of Classification Search
    CPC ......... H04W 4/40; H04W 84/12; H04W 4/46; H04J 3/0667; H04J 3/0641; H04J 3/0658;
    (Continued)

(56) References Cited

U.S. PATENT DOCUMENTS

| | | | |
|---|---|---|---|
| 2016/0149692 A1* | 5/2016 | Kim ..................... | H04J 3/0641 |
| | | | 370/503 |
| 2019/0363815 A1 | 11/2019 | Bogenberger et al. | |
| 2020/0295861 A1 | 9/2020 | Zinner | |

FOREIGN PATENT DOCUMENTS

| | | |
|---|---|---|
| EP | 3 703 286 A1 | 9/2020 |
| WO | WO 2021/003685 A1 | 1/2021 |

OTHER PUBLICATIONS

International Search Report (PCT/ISA/210) issued in PCT Application No. PCT/EP2022/060951 dated Jul. 28, 2022 (3 pages).
(Continued)

*Primary Examiner* — Tu X Nguyen
(74) *Attorney, Agent, or Firm* — Crowell & Moring LLP

(57) ABSTRACT

Provided is a method for validating synchronized local times of at least a first control unit and a second control unit of a vehicle, wherein the method includes receiving, at each one of the at least two control units, a synchronization message including a master time; synchronizing, at each one of the at least two control units, a local time of the respective one of the at least two control units to the received master time; communicating the synchronized local time from the first control unit to the second control unit; and comparing, at the second control unit, the communicated local time of the first control unit to the synchronized local time of the second control unit for validating the synchronized local times of the at least two control units.

13 Claims, 1 Drawing Sheet

(58) Field of Classification Search
CPC ...... H04J 3/0638; H04J 3/0682; H04J 3/0661;
H04J 3/0644; H04J 3/0655
See application file for complete search history.

(56) References Cited

OTHER PUBLICATIONS

Written Opinion (PCT/ISA/237) issued in PCT Application No.
PCT/EP2022/060951 dated Jul. 28, 2022 (6 pages).
Extended European Search Report issued in European Application
No. 21176508.6 dated Dec. 8, 2021 (6 pages).
"(R) Taxonomy and Definitions for Terms Related to Driving
Automation Systems for On-Road Motor Vehicles," Surface Vehicle
Recommended Practice, SAE (Society of Automotive Engineering)
International, J3016TM, Sep. 2016, pp. 1-30 (30 pages).
Raju, S. et al., "Time synchronized diagnostic event data recording
based on Autosar," 2017 IEEE International Conference on Advanced
Networks and Telecommunications Systems (ANTS), IEEE, Dec.
17, 2017, pp. 1-6, XP033358556 (6 pages).

* cited by examiner

VALIDATING SYNCHRONIZED LOCAL TIMES OF AT LEAST A FIRST AND A SECOND CONTROL UNIT

BACKGROUND AND SUMMARY

The present invention is directed to a method for validating synchronized local times of at least a first control unit and a second control unit of a vehicle, and a communication network configured to carry out the method.

The background of the invention is with respect to automated vehicles with functions corresponding to level 1 and/or level 2 according to SAE J3016, but is not limited thereto.

In general, for an automated or autonomous vehicle, e.g., a car, there is a lot of data processing including perception from multiple sensors. The data processing may be done on one control unit (ECU), e.g., included in one of the sensors, thereby taking the data from the sensors as an input, fusing the data and processing the data before sending data, e.g., a control signal, to the vehicle. Especially for fusing the data, the data of the multiple sensors need to have the same, i.e., a synchronized, timestamp.

More specifically, for level 2 vehicles some functions, such as automatic emergency braking, may require sensor fusion with Automotive Safety Integrity Level, safety requirement level specified by ISO 26262 for safety-relevant systems in motor vehicles (ASIL B) from input sensors such as a camera, a radar sensor and/or a lidar sensor.

One of the given sensors may act as a master and each of the other sensors may act as a slave providing the required data with ASIL integrity to the master.

If the input sensors including master and slave are not synchronized with respect to one global time, it may result in a safety goal violation and hence non-fulfillment of the required ASIL integrity.

An object of the invention is to provide a solution to ensure that at least some, preferably all, sensors of a network use a synchronized timestamp. More concretely, one object of the invention may be formulated as to provide a solution suitable to ensure a time synchronization for sensor fusion of data provided by multiple perception sensors used at a level 2 vehicle.

This object is solved by the features of the independent claims. The dependent claims contain preferred further developments of the invention.

More specifically, the object is solved by a method for validating synchronized local times of at least a first and a second control unit of a vehicle.

The method comprises a step of receiving, at each one of the at least two control units, a first synchronization message including a master time.

The method further comprises a step of synchronizing, at each one of the at least two control units, a local time of the respective one of the at least two control units to the received master time.

The method further comprises a step of communicating the synchronized local time from the first control unit to the second control unit.

The method further comprises a step of comparing, at the second control unit, the communicated local time of the first control unit to the synchronized local time of the second control unit for validating the synchronized local times of the at least two control units.

The step of comparing the communicated local time of the first control unit to the synchronized local time of the second control unit may include determining, at the second control unit, a difference between the communicated local time of the first control unit and the synchronized local time of the second control unit, and raising, at the second control unit, an error flag if the determined difference is larger than a predefined threshold.

The step of communicating the synchronized local time from the first control unit to the second control unit may include sending a second synchronization message from the first control unit to the second control unit. The second synchronization message may include a first local time corresponding to the synchronized local time of the first control unit at the time of sending the second synchronization message.

The step of communicating the synchronized local time from the first control unit to the second control unit may include sending a follow-up message from the first control unit to the second control unit when a predetermined time after sending the second synchronization message is expired. The follow-up message may include the first local time corresponding to the synchronized local time of the first control unit at the time of sending the second synchronization message.

The step of comparing the communicated local time of the first control unit to the synchronized local time of the second control unit may include determining, at the second control unit, the communicated local time based on the second synchronization message and/or the follow-up message.

The step of determining the communicated local time may include determining, at the second control unit, a first local time corresponding to the synchronized local time of the second control unit at the time of receiving the second synchronization message.

The step of determining the communicated local time may further include determining, at the second control unit, a second local time corresponding to the synchronized local time of the second control unit at the time of receiving the follow-up message.

The step of determining the communicated local time may further include determining, at the second control unit, a difference between the first local time corresponding to the synchronized local time of the first control unit at the time of sending the second synchronization message and the first local time corresponding to the synchronized local time of the second control unit at the time of receiving the second synchronization message.

The step of determining the communicated local time may further include determining, at the second control unit, a sum of the difference and the second local time corresponding to the synchronized local time of the second control unit at the time of receiving the follow-up message for determining the communicated local time.

In the following, the above given abstract description is summarized in other words and concretized.

Each one of multiple sensors inputting their data to a common sensor data fusion receives a synchronization message from a grand master.

The master sensor carrying out the sensor data fusion also receives the synchronization message from the grand master and synchronizes itself with respect to a grand master time included in the synchronization message.

For a successful sensor data fusion with ASIL integrity, all sensors need to be synchronized to the grand master time.

All slave sensors, irrespective of their communication standard (e.g., Flexray, CAN-FD or Ethernet), carry out a forward synchronization with respect to the time grand master and a backward synchronization method with respect to the master sensor.

The master sensor receives a backward time synchronization message from each slave sensor indicating the time with which the respective slave sensor is synchronized.

The master sensor verifies each received time synchronization message received from the slave sensors by cross checking it with the time synchronization message provided by the other slave sensors and also with its own synchronized local time.

If there is any deviation larger than a given threshold, a synchronization error is detected and a corresponding error message, e.g., indicating 'time sync. failed', is set by the master sensor.

Thus, the safety integrity level of the master sensor may also be claimed by the slave sensors. That is, if the master sensor is implemented as ASIL D, then the slave sensors could also claim ASIL D.

In case of using the AUTOSAR standard, the forward and/or backward synchronization may use the synchronized time-base manager (StbM) and the time synchronization communication stack with respect to each communication bus.

In case of using the Ethernet standard, the backward synchronization message may have a different EtherType than that of the forward Synchronization message.

The forward and/or backward time synchronization may be done using the Precision Time Protocol (PTP) including four or five messages (i.e., synchronization message, (synchronization) follow-up message, delay request message, delay response message, and delay response follow-up message) at least partly.

That is, at an Ethernet communication bus, for example, the backward synchronization message could be reduced to only two messages from the PTP communication protocol, i.e., the synchronization and the follow-up message, thereby reducing the CPU utilization. In order to improve accuracy, the backward synchronization could also be provided with five messages of communication protocol for sensors.

Furthermore, a communication network comprising a first control unit and a second control unit being connected to each other is provided.

The first control unit and/or the second control unit may be part of a sensor, such as a camera, a radar sensor and/or a lidar sensor. The first control unit may be called slave control unit. The second control unit may be called master control unit. The second control unit may be configured to carry out data processing, e.g., a sensor data fusion, with data provided by the first control unit and/or the second control unit. The first control unit and/or the second control unit may comprise a local clock providing the local time, respectively.

The first control unit and the second control unit are configured to receive a synchronization message including a master time, respectively.

The communication network may further comprise a master time control unit, wherein the master time control unit may be configured to send the master time to the first control unit and the second control unit, optionally cyclically or periodically. The master time control unit may comprise a hardware counter for providing the master time.

With respect to a safety integrity level: Automotive Safety Integrity Level (ASIL), as used herein, is a risk classification scheme defined by the ISO 26262—Functional Safety for Road Vehicles standard. This classification helps defining the safety requirements necessary to be in line with the ISO 26262 standard. The ASIL is established by performing a risk analysis of a potential hazard by looking at the Severity, Exposure and Controllability of the vehicle operating scenario. The safety goal for that hazard in turn carries the ASIL requirements. There are four ASILs identified by the standard: ASIL A, ASIL B, ASIL C, ASIL D. ASIL D dictates the highest integrity requirements on the product and ASIL A the lowest. Hazards that are identified as QM do not dictate any safety requirements.

It may be sufficient, if the master time is provided with QM. However, the master time may also be provided with ASIL, e.g., with ASIL B.

The first and the second control unit are configured to synchronize their local time to the received master time, respectively.

The first control unit is configured to communicate the synchronized local time to the second control unit.

The first control unit may be configured to communicate its synchronized local time with ASIL, e.g., ASIL B.

The second control unit is configured to compare the communicated local time of the first control unit to the synchronized local time of the second control unit for validating the synchronized local times of the first and the second control unit.

The second control unit may be configured to validate the synchronized local times with ASIL, e.g., ASIL B.

The communication network may be configured to carry out the above describe method at least partly. The description given above with respect to the method applies mutatis mutandis to the communication network and vice versa.

For comparing the communicated local time of the first control unit to the synchronized local time of the second control unit, the second control unit may be configured to determine a difference between the communicated local time of the first control unit and the synchronized local time of the second control unit, and raise an error flag if the determined difference is larger than a predefined threshold.

For communicating the synchronized local time from the first control unit to the second control unit, the first control unit may be configured to send a second synchronization message to the second control unit. The second synchronization message may include a first local time corresponding to the synchronized local time of the first control unit at the time of sending the synchronization message.

For communicating the synchronized local time from the first control unit to the second control unit, the first control unit may be configured to send a follow-up message to the second control unit when a predetermined time after sending the second synchronization message is expired. The follow-up message may include the first local time corresponding to the synchronized local time of the first control unit at the time of sending the second synchronization message.

For comparing the communicated local time of the first control unit to the synchronized local time of the second control unit, the second control unit may be configured to determine the communicated local time based on the second synchronization message and/or the follow-up message.

For determining the communicated local time, the second control unit may be configured to determine a first local time corresponding to the synchronized local time of the second control unit at the time of receiving the second synchronization message.

For determining the communicated local time, the second control unit may be further configured to determine a second local time corresponding to the synchronized local time of the second control unit at the time of receiving the follow-up message.

For determining the communicated local time, the second control unit may be further configured to determine a difference between the first local time corresponding to the synchronized local time of the first control unit at the time of sending the second synchronization message and the first local time corresponding to the synchronized local time of the second control unit at the time of receiving the second synchronization message.

For determining the communicated local time, the second control unit may be further configured to determine a sum of the difference and the second local time corresponding to the synchronized local time of the second control unit at the time of receiving the follow-up message for determining the communicated local time.

In the following, a description of an embodiment of the present invention is given with respect to FIGS. 1 and 2.

DETAILED DESCRIPTION OF THE DRAWINGS

Figure 1:
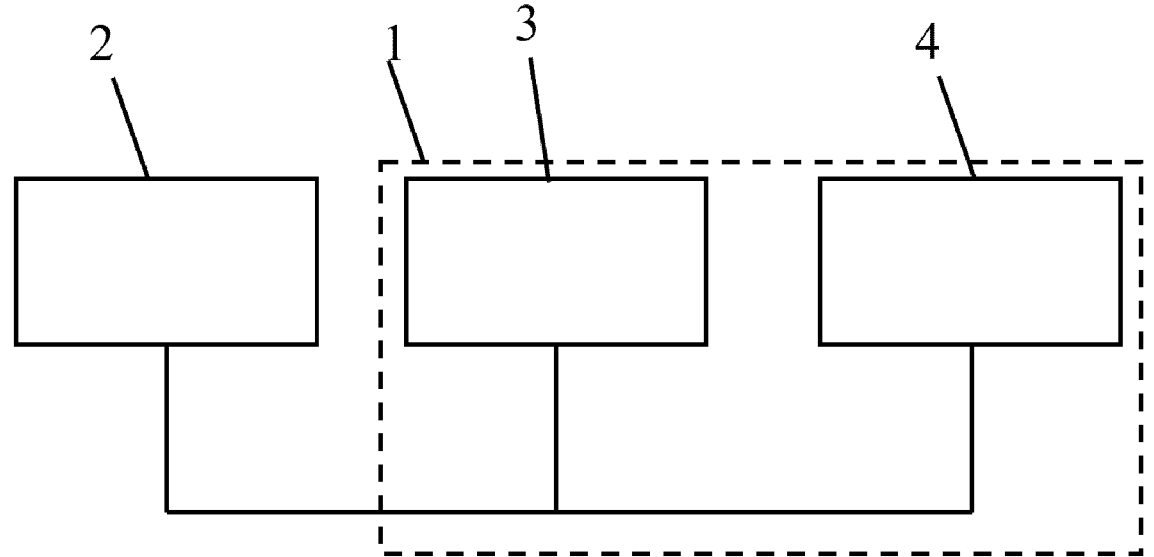
FIG. 1 depicts schematically a communication network of a vehicle configured to carry out a method for validating synchronized local times.
Figure 2:
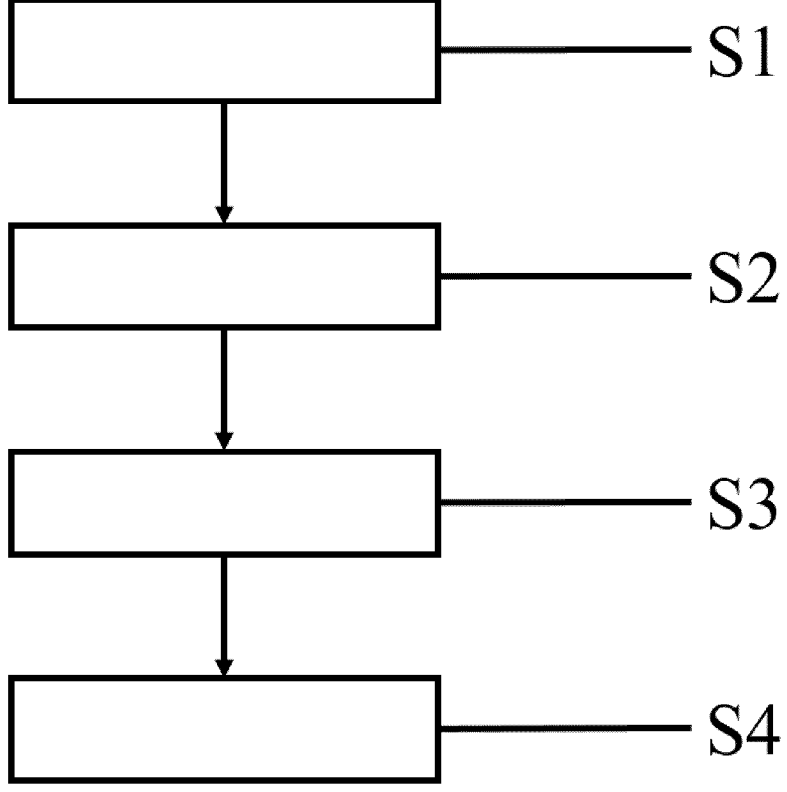
FIG. 2 depicts schematically a flowchart of the method for validating the synchronized local times.

As can be gathered from FIG. 1, the communication network 1 comprises a master control unit 3 and a slave control unit 4, and is connected to a master time control unit 2.

The communication network 1 is configured to carry out the method for validating the synchronized local times of the master control unit 3 and the slave control unit 4.

In a first step S1 of the method, the master time control unit 2 sends a first synchronization message including a master time to the master control unit 3 and the slave control unit 4, respectively, such that both control units 3, 4 receive the first synchronization message including the master time.

In a second step S2 of the method, the master and slave control units 3, 4 synchronize their local time to the received master time, respectively.

The first and second steps S1, S2 may be called forward synchronization, wherein the PTP may be used for the forward synchronization.

In a third step S3 of the method, the slave control unit 4 communicates its synchronized local time to the master control unit 3.

In a fourth step S4 of the method, the master control unit 4 compares the communicated local time of the slave control unit 4 to the synchronized local time of the master control unit 3 for validating the synchronized local times of the two control units 3, 4.

Therefore, the master control unit 3 determines a difference between the communicated local time of the slave control unit 4 and the synchronized local time of the master control unit 3, and raises an error flag if the determined difference is larger than a predefined threshold.

For communicating the synchronized local time from the slave control unit 4 to the master control unit 3 in the third step S3 and for comparing the communicated local time of the slave control unit 4 to the synchronized local time of the master control unit 3 in the fourth step S4, i.e., for the backward synchronization, two options are possible which may be carried out additionally or alternatively.

In a first option, the slave control unit 4 sends a second synchronization message to the master control unit 3 in the third step S3, wherein the second synchronization message includes the local time corresponding to the synchronized local time of the slave control unit 3 at the time of sending the second synchronization message.

In the fourth step S4, the master control unit 3 determines the communicated local time based on the second synchronization message sent in the third step S3, e.g., the communicated local time is the local time included in the second synchronization message, and compares the determined communicated local time to the synchronized local time of the master control unit 4.

In a second option, the slave control unit 4 sends a second synchronization message to the master control unit 3 in the third step S3, wherein the second synchronization message does not necessarily include the local time corresponding to the synchronized local time of the slave control unit 3 at the time of sending the second synchronization message.

When a predetermined time after sending the second synchronization message is expired, the slave control unit 4 sends a follow-up message to the master control unit 3, wherein the follow-up message includes the local time corresponding to the synchronized local time of the first control unit at the time of sending the second synchronization message.

In the fourth step S4, the master control unit 3 determines the communicated local time based on the second synchronization message and the follow-up message of the third step S3, and compares the determined communicated local time to the synchronized local time of the master control unit 4.

Determining the communicated local time according to the second option will be explained in detail below, wherein the third and the fourth step S3, S4 may be carried out at least partly simultaneously.

The master control unit 3 determines in the fourth step S4 a local time corresponding to, e.g., being, the synchronized local time of the master control unit 3 at the time of receiving the second synchronization message in the third step S3.

Furthermore, the master control unit 3 determines in the fourth step S4 a local time corresponding to, e.g., being, the synchronized local time of the master control unit 3 at the time of receiving the follow-up message in the third step S3.

Then, the master control unit 3 determines a difference between the local time corresponding to the synchronized local time of the slave control unit 4 at the time of sending the second synchronization message, i.e., the time included in the follow-up message send in the third step S3, and the determined local time corresponding to the synchronized local time of the master control unit 3 at the time of receiving the second synchronization message in the third step S3.

Then, the master control unit 3 determines a sum of the determined difference and the local time corresponding to the synchronized local time of the master control unit 3 at the time of receiving the follow-up message. That is, the determined difference is added to the determined local time corresponding to the synchronized local time of the master control unit 3 at the time of receiving the follow-up message. The determined, i.e., calculated sum, is in the present case equal to the communicated local time.

In conclusion, according to the second option the first two messages of the PTP are used for the backward synchronization. However, the invention is not limited thereto and it would also be possible to use all four messages, or even five messages, of the PTP by additionally providing a follow-up message following a delay response for carrying out the backward synchronization. Moreover, the invention is not limited to two control units. It is also possible to provide more than two control units, e.g., one master control unit for several slave control units, and to carry out the above described method for every slave control unit, respectively, and/or do a cross checking of the synchronized local times of the slave control units using the above described method at a respective master control unit.

REFERENCE SIGNS LIST

1 communication network
2 master time control unit
3 master control unit
4 slave control unit
S1-S4 steps of the method

The invention claimed is:

1. A method for validating synchronized local times of at least a first control unit and a second control unit of a vehicle, the method comprising:

receiving, at the first control unit and the second control unit, a first synchronization message including a master time;

synchronizing, at the first control unit and the second control unit, a local time of one of the first control unit and the second control unit to the received master time;

communicating the synchronized local time from the first control unit to the second control unit;

comparing, at the second control unit, the communicated local time of the first control unit to the synchronized local time of the second control unit for validating the synchronized local times of the first control unit and the second control unit;

wherein the comparing the communicated local time of the first control unit to the synchronized local time of the second control unit comprises:

determining, at the second control unit, a difference between the communicated local time of the first control unit and the synchronized local time of the second control unit; and raising, at the second control unit, an error flag in a case in which the determined difference is larger than a predefined threshold.

2. A method for validating synchronized local times of at least a first control unit and a second control unit of a vehicle, the method comprising:

receiving, at the first control unit and the second control unit, a first synchronization message including a master time;

synchronizing, at the first control unit and the second control unit, a local time of one of the first control unit and the second control unit to the received master time;

communicating the synchronized local time from the first control unit to the second control unit; and comparing, at the second control unit, the communicated local time of the first control unit to the synchronized local time of the second control unit for validating the synchronized local times of the first control unit and the second control unit;

wherein the communicating the synchronized local time from the first control unit to the second control unit comprises:

sending a second synchronization message from the first control unit to the second control unit;

wherein the second synchronization message includes a first local time corresponding to the synchronized local time of the first control unit at the time of sending the synchronization message.

3. The method according to claim 2, wherein the communicating the synchronized local time from the first control unit to the second control unit comprises:

sending a follow-up message from the first control unit to the second control unit when a predetermined time after sending the second synchronization message is expired;

wherein the follow-up message includes the first local time corresponding to the synchronized local time of the first control unit at the time of sending the second synchronization message.

4. The method according to claim 2, wherein the comparing the communicated local time of the first control unit to the synchronized local time of the second control unit comprises:

determining, at the second control unit, the communicated local time based on the second synchronization message and/or the follow-up message.

5. The method according to claim 3, wherein the comparing the communicated local time of the first control unit to the synchronized local time of the second control unit comprises:

determining, at the second control unit, the communicated local time based on the second synchronization message and/or the follow-up message.

6. The method according to claim 5, wherein the determining the communicated local time comprises:

determining, at the second control unit, a first local time corresponding to the synchronized local time of the second control unit at the time of receiving the second synchronization message;

determining, at the second control unit, a second local time corresponding to the synchronized local time of the second control unit at the time of receiving the follow-up message;

determining, at the second control unit, a difference between the first local time corresponding to the synchronized local time of the first control unit at the time of sending the second synchronization message and the first local time corresponding to the synchronized local time of the second control unit at the time of receiving the second synchronization message; and determining, at the second control unit, a sum of the difference and the second local time corresponding to the synchronized local time of the second control unit at the time of receiving the follow-up message for determining the communicated local time.

7. A communication network comprising a first control unit and a second control unit that are connected to each other, wherein:

the first control unit and the second control unit are configured to receive a first synchronization message including a master time, respectively;

the first control unit and the second control unit are configured to synchronize their local time to the received master time, respectively;

the first control unit is configured to communicate the synchronized local time to the second control unit; and the second control unit is configured to compare the communicated local time of the first control unit to the synchronized local time of the second control unit for validating the synchronized local times of the first control unit and the second control unit;

wherein for comparing the communicated local time of the first control unit to the synchronized local time of the second control unit, the second control unit is configured to:

determine a difference between the communicated local time of the first control unit and the synchronized local time of the second control unit; and raise an error flag if the determined difference is larger than a predefined threshold.

8. The communication network according to claim 7, wherein, for communicating the synchronized local time from the first control unit to the second control unit, the first control unit is configured to:

send a second synchronization message to the second control unit;

wherein the second synchronization message includes a first local time corresponding to the synchronized local time of the first control unit at the time of sending the second synchronization message.

9. A communication network comprising a first control unit and a second control unit that are connected to each other, wherein:

the first control unit and the second control unit are configured to receive a first synchronization message including a master time, respectively;

the first control unit and the second control unit are configured to synchronize their local time to the received master time, respectively;

the first control unit is configured to communicate the synchronized local time to the second control unit; and the second control unit is configured to compare the communicated local time of the first control unit to the synchronized local time of the second control unit for validating the synchronized local times of the first control unit and the second control unit;

wherein, for communicating the synchronized local time from the first control unit to the second control unit, the first control unit is configured to:

send a second synchronization message to the second control unit;

wherein the second synchronization message includes a first local time corresponding to the synchronized local time of the first control unit at the time of sending the second synchronization message.

10. The communication network according to claim 9, wherein, for communicating the synchronized local time from the first control unit to the second control unit, the first control unit is configured to:

send a follow-up message to the second control unit when a predetermined time after sending the second synchronization message is expired;

wherein the follow-up message includes the first local time corresponding to the synchronized local time of the first control unit at the time of sending the second synchronization message.

11. The communication network according to claim 9, wherein, for comparing the communicated local time of the first control unit to the synchronized local time of the second control unit, the second control unit is configured to determine the communicated local time based on the second synchronization message and/or the follow-up message.

12. The communication network according to claim 10, wherein, for comparing the communicated local time of the first control unit to the synchronized local time of the second control unit, the second control unit is configured to determine the communicated local time based on the second synchronization message and/or the follow-up message.

13. The communication network according to 11, wherein, for determining the communicated local time, the second control unit is configured to:

determine a first local time corresponding to the synchronized local time of the second control unit at the time of receiving the second synchronization message;

determine a second local time corresponding to the synchronized local time of the second control unit at the time of receiving the follow-up message;

determine a difference between the first local time corresponding to the synchronized local time of the first control unit at the time of sending the synchronization message and the first local time corresponding to the synchronized local time of the second control unit at the time of receiving the synchronization message; and determine a sum of the difference and the second local time corresponding to the synchronized local time of the second control unit at the time of receiving the follow-up message for determining the communicated local time.

* * * * *